(12) United States Patent
Picard

(10) Patent No.: US 7,747,084 B2
(45) Date of Patent: Jun. 29, 2010

(54) METHODS AND APPARATUS FOR TARGET DISCRIMINATION USING OBSERVATION VECTOR WEIGHTING

(75) Inventor: Thomas G. Picard, Winter Garden, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1414 days.

(21) Appl. No.: 11/152,349

(22) Filed: Jun. 15, 2005

(65) Prior Publication Data

US 2006/0284761 A1 Dec. 21, 2006

(51) Int. Cl.
*G06K 9/62* (2006.01)
*G06E 1/00* (2006.01)
(52) U.S. Cl. .......................... 382/228; 382/118; 706/20
(58) Field of Classification Search ................. 382/228, 382/224, 181; 704/243, 254, 256, 200, 255, 704/236, 256.5, E15.029, E15.028, E15.251, 704/E15.011; 702/3, 6, 14; 703/2; 706/20, 706/52, 42, 45; 705/37; 700/29; 342/96, 342/90, 357.04; 455/456.1
See application file for complete search history.

(56) References Cited

U.S. PATENT DOCUMENTS

| 5,271,088 | A  | * | 12/1993 | Bahler ......................... 704/200 |
| 6,466,908 | B1 | * | 10/2002 | Baggenstoss ................ 704/256 |
| 7,561,991 | B2 | * | 7/2009  | Matsunaga et al. ............. 703/2 |
| 2004/0167893 | A1 |   | 8/2004  | Matsunaga et al. |

OTHER PUBLICATIONS

K Kim et al, "Combining Experts' Opinions: An Application To Target identifications," Control pplications, 1992, First tEEE Conference on Dayton, OH, USA, Sep. 13-16, 1992. New York, Y, IEEE, US, Sep. 13, 1992, pl0. 415-419. XP010045708.*
UWEE Technical Report, No. UWEETR-2002-0003, Jan. 2002, Dept. of Electrical Engineering, Univ. of Washington, pp. 1-32, "What HMMs Can Do," J. Bilmes.
Proceedings of the Eighth International Workshop on Frontiers in Handwriting Recognition (IWFHR '02), 2002 IEEE, "On line Signature Verification: Fusion of a Hidden Markov Model and a Neural Network via a Support Vector Machine," M. Fuentes et al.
"A Supervised Two-channel Learning Method for Hidden Markov Model and Application on Lip Reading," Say Wei Foo et al., 2002 IEEE, pp. 334-338.

(Continued)

*Primary Examiner*—Sheela C Chawan
(74) *Attorney, Agent, or Firm*—Birch, Stewart, Kolasch & Birch, LLP

(57) ABSTRACT

Methods and systems for discriminating targets using information derived from a sensor are presented. In one embodiment, a method features receiving a plurality of observations corresponding to a target; retrieving probabilities of the observations associated with each of a plurality of states, where the states are based a statistical model associated with at least one target type; consolidating the probabilities of observations for each of the plurality of states using a weighted combination; computing the probability of each state associated with the plurality of observations; selecting a state of the target based upon the computed probability of each state; and discriminating the target based upon the selected state.

24 Claims, 5 Drawing Sheets

OTHER PUBLICATIONS

John Graham-Cumming, "Naïve Bayesian Text Classification," Dr. Dobb's Journal, May 2005, pp. 16-20.

K Kim et al , "Combining Experts' Opinions: An Application To Target Identifications," Control Applications, 1992, First IEEE Conference on Dayton, OH, USA, Sep. 13-16, 1992. New York, NY, iEEE, US, Sep. 13, 1992, pp. 415-419, XP010045708.

R Brunelli et al , "Person Identification Using Multiple Cues," IEEE Transactions on Pattern Analysis and Machine Intelligence, IEEE Service Center, Los Alamitos, CA, US, vol. 17, No. 10, Oct. 1, 1995, pp. 955-966, XP000532201.

A Solberg et al , "A Comparison of Criteria for Decision Fusion and Parameter Estimation in Statistical Multisensor Image Classification," Geoscience and Remote Sensing Symposium, 2002, IGARSS '02, 2002 IEEE International, Jun. 24-28, 2002, Piscataway, NJ, USA, IEEE, vol. 1, Jun. 24, 2002, pp. 72-74, XP010597244.

Proceedings of the IEEE, vol. 77, No. 2, Feb. 1989, pp. 257-286, "A Tutorial on Hidden Markov Models and Selected Applications in Speech Recognition," L. Rabiner.

IEEE Transactions on Aerospace and Electronic Systems, vol. 33, No. 1, Jan. 1997, pp. 11-28, "Data Fusion and Tracking Using HMMs in a Distributed Sensor Network,". F. Martinerie.

1992 IEEE, Jul. 1992, pp. 923-925, "Data Association and Tracking from Distributed Sensors Using Hidden Markov Models and Evidential Reasoning," F. Martinerie et al.

"Prediction of Notes from Vocal Time Series Produced by Singing Voice," U. Garczarek et al., 2003, pp. 1-12.

* cited by examiner

METHODS AND APPARATUS FOR TARGET DISCRIMINATION USING OBSERVATION VECTOR WEIGHTING

BACKGROUND OF THE INVENTION

Embodiments of the present invention generally relate to statistical approaches for modeling systems and/or processes, and more specifically, the application of statistical models to sensor system processing to extract information from the various outputs produced by a sensor system.

It is often helpful to model physical systems and/or processes in order to gain a better understanding as to how they function. Such models have been shown be very useful for enabling and enhancing a wide variety of practical systems, such as, for example, discrimination systems, prediction systems, recognition and identification systems, etc. Generally, most models can be classified as either deterministic models or statistical models. Deterministic models typical exploit known structures or properties of a system and/or signal, and derive parameters associated therewith. Statistical models can characterize the statistical properties of the system and/or signal. These models can assume the system and/or signal can be characterized by a pre-selected parametric random process, and attempt to estimate parameters associated therewith. Examples of known statistical models include models based upon Gaussian processes, Poison processes, Markov processes, hidden Markov processes, Bayesian theory, etc.

Statistical models which effectively model real-world systems can be sophisticated and therefore can utilize a large number of parameters and/or states. The computations associated with the implementation such models can present a variety of challenges. This is particularly true when the statistical models are used in conjunction with Bayesian theory. For example, probabilities associated with states of a chosen model, and observations of a sensor, will have values ranging between 0 and 1. Complex computations involving these values can produce underflow problems. Underflow problems can occur when numbers reach values which are too small to be accurately represented the finite word lengths used by digital processors. Numbers experiencing underflow errors can be improperly truncated to a value of zero, thus adversely affecting the accuracy of the computation.

Moreover, the relative importance between various parameters associated with the statistical model is often overlooked, thus ignoring information that could improve the efficiency and results of the statistical model. For example, by emphasizing important observations and de-emphasizing those less important, computations can be adapted to improve speed and accuracy, which can be important for real-time, mission-critical systems. Additionally, by emphasizing the relative importance of observations, inaccuracies introduced through assumptions of statistical independence, which are typically made to simplify analysis and/or computations, can be compensated to improve results.

SUMMARY OF THE INVENTION

Accordingly, embodiments of the present invention are directed to target discrimination using observation vector weighting which substantially overcome and/or obviate challenges associated with the related art.

In one embodiment of the invention, a method for discriminating targets using information derived from a sensor is presented. The method features receiving a plurality of observations corresponding to a target retrieving probabilities of the observations associated with each of a plurality of states, wherein the states can be based on a statistical model associated with at least one target type; consolidating the probabilities of observations for each of the plurality of states using a weighted combination; computing the probability of each state associated with the plurality of observations; selecting a state of the target based upon the computed probability of each state; and discriminating the target based upon the selected state.

In another embodiment of the invention, an apparatus which performs target discrimination using information derived from a sensor is presented. The apparatus features at least one processor unit and memory functionally coupled to the processor, which can store probabilities of the observations associated with each of a plurality of states, wherein the states can be based on a statistical model associated with at least one target type, and stores instructions causing the processor to receive a plurality of observations corresponding to a target, consolidate the probabilities of observations for each of the plurality of states using a weighted combination, compute the probability of each state associated with the plurality of observations, select a state of the target based upon the computed probability of state, and discriminate the target based upon the selected state.

In yet another embodiment of the invention, a system for performing target discrimination based upon statistical models is presented. The system features a sensor which receives signals from a target; a signal conditioner/information extractor, operably coupled to the sensor, which derives observations from the received signals; a target discriminator, which receives the observations from the signal conditioner/information extractor, further comprising at least one statistical model corresponding to an expected target, wherein the at least one statistical model includes a plurality of states; an observation combiner which combines probabilities of the observations for each of the plurality of states using a weighted geometric average, a state estimator which computes the probability of each state from the plurality of states, which is associated with the plurality of observations, wherein the target discriminator selects a state of the target based upon the computed probability of states and discriminates the target based upon the selected state.

In another embodiment of the invention, a method for determining the state of an physical system using a plurality of observations and at least one statistical model is presented. The method features receiving probabilities of the observations associated with each of a plurality of states, wherein the states are based upon the at least one statistical model; providing a plurality of weight values, wherein each weight value uniquely corresponds to one observation; applying each weight value to the probability of observation to which it corresponds; combining the weighted probabilities of observations for each of the plurality of states; and computing the probability of each state associated with the plurality of observations.

Additional features of embodiments of the invention will be set forth in the description which follows, and in part will be apparent from the description, or can be learned by practice of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

The following detailed description of the embodiments of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
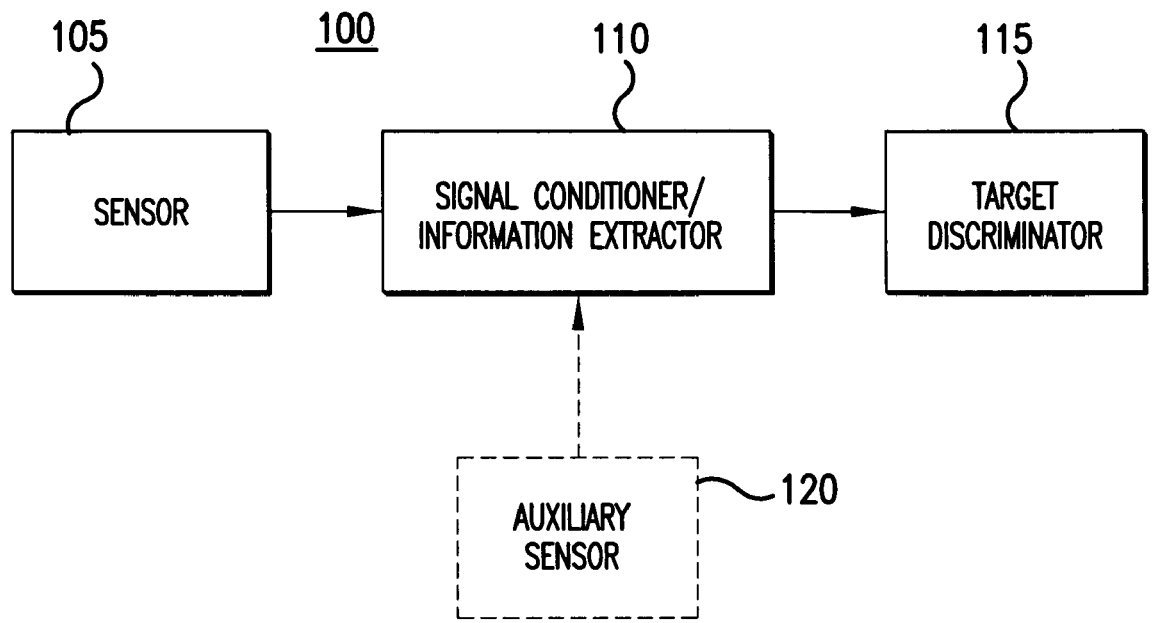
FIG. 1 shows an exemplary top-level system diagram illustrating an embodiment of the invention.

FIG. 1 depicts a top-level diagram for a target sensing and identification system (TSIS) 100 which is consistent with an embodiment of the invention. TSIS 100 can include a sensor 105, a signal conditioner/information extractor 110, and a target discriminator 115. Auxiliary sensor 120 (depicted in dashed lines) can also be optionally included. Sensor 105 can gather information through measurements of objects that may be within an operating range and/or a field of view. These measurements, in addition to other information, can be transferred from sensor 105 in the form of signals to signal conditioner/information extractor 110. Signal conditioner/information extractor 110 can condition received signals, and enhance and extract information from the signals associated with the sensed objects using analog and/or digital signal processing techniques. Additionally, signal conditioner/information extractor 110 can perform an initial discrimination process where objects of interest (hereinafter referred to as targets) selected form all of the objects sensed by sensor 105. This functionality can be used as a buffer to reduce the computational workload of subsequent operations in the target discriminator 115. Information regarding the targets can then be transferred to target discriminator 115. Target discriminator 115 can further operate information provided by signal conditioner/information extractor 110 to further discriminate between the targets measured by sensor 105, and can identify the targets based upon target discrimination processing. Other embodiments consistent with the invention can include one or more auxiliary sensor(s) 120. Auxiliary sensor(s) 120 can provide additional information to augment the signals provided sensor 105, and provide the additional information through signal conditioner/information extractor 110 to be supplied to the target discriminator 115.

Further referring to FIG. 1, sensor 105 can be an active or passive device, and include any sensing devices known to those of ordinary skill in the art. For example, sensor 105 can be a radar system, such as a fire-control radar or an imaging radar. Sensor 105 can also be an electro-optics device which can operate in the visible, infrared, ultraviolet, or multi-spectral wavelengths. Sensor 105 could also include at least one transducer either functioning in an active mode, such as, for example, those found in sonar systems; or in a passive mode, as in, for example, a microphone. In other embodiments, sensor 105 can be a multi-modal sensor which could combine of any of the sensors described above and/or additional sensors known to one of ordinary skill. Moreover, one of ordinary skill in the art would appreciate that in the general sense, sensor 105 can be any device that collects and/or aggregates measurements which can be observations from any type of physical process. Moreover, like sensor 105, auxiliary sensor(s) 120 can be any type of active or passive sensor known to one of ordinary skill in the art.

Signal conditioner/information extractor 110 can be used to combine information from such a multi-model sensor. Additionally, signal conditioner/information extractor 110 can receive information from auxiliary sensor(s) 120 for additional processing, and/or to be combined and co-processed with signals provided by main sensor 105. Such processing can be performed in an analog and/or digital manner, and can include any variety of signal conditioning, signal enhancement, noise reduction, and information extraction known to one of ordinary skill. Such examples can include spectral processing, linear and/or nonlinear filtering, kalman filtering, etc. Target discriminator 115 can utilize the information provided by signal conditioner/information extractor 110, and optionally, inputs from auxiliary sensor(s) 120 (through signal conditioner/information extractor 110) to discriminate and identify targets. Further details of target discriminator 115 are presented below.

Figure 2:
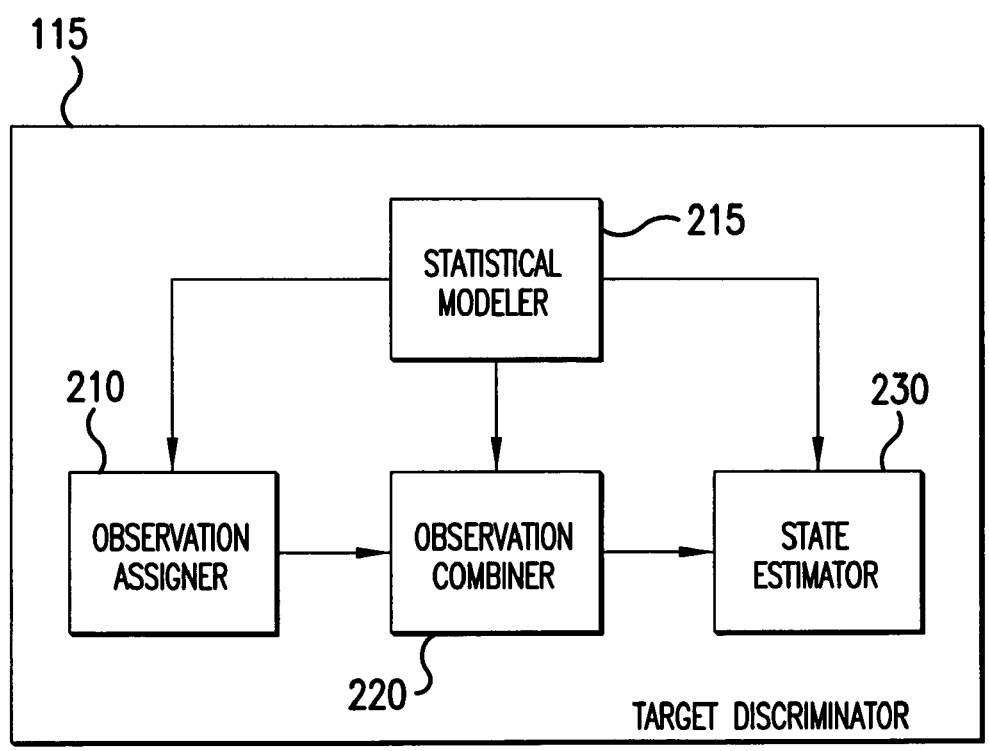
FIG. 2 shows an exemplary system diagram of a target discriminator consistent with an embodiment of the invention.

FIG. 2 depicts a block diagram for an exemplary target discriminator consistent with the embodiment shown above in FIG. 1. Although the various components of FIG. 2 are illustrated as discrete elements, such an illustration is for ease of explanation, and it should be recognized that certain operations of the various elements could overlap or be combined depending upon implementation of the invention. One of ordinary skill in the art would also appreciate that each functional unit depicted can be performed partially or completely in software, hardware, and/or firmware, or in any combination thereof.

Target discriminator 115 can include an observation assigner 210, statistical modeler 215, an observation combiner 220, and a state estimator 230. Information provided by signal conditioner/information extractor 110 and/or auxiliary sensor(s) 120 can be provided as a plurality of observations. Specific types of observations, and their associated values, can be interpreted as features associated with various types of targets. Observation assigner 210 can assign probabilities with each observation given states. States can be associated with statistical models provided by statistical modeler 215. Different statistical models can be used for varying classes of targets; however, the same statistical model can be used to model multiple target types. Typically, different statistical models can be associated with different states and the states can be mutually exclusive. Probabilities of observations given states are provided to the observation combiner 220, which can consolidate a plurality of probabilities of observations for a state into a combined probability of observations given the state. State estimator 230 receives the combined probability of observations for each state associated with the statistical modeler, and estimates a state of a target. One of ordinary skill in the art would appreciate that the invention can encompass other embodiments, whereby target discriminator 215 can be used to discriminate between states of any physical system, and is in no way meant to be limited only to the discrimination of targets.

Further details of observation assigner 210 are presented below. Information provided by signal conditioner/information extractor 110 can include a plurality of observations associated with the target. While the observations can vary depending upon target type, they can be shared or overlap among different statistical models. These observations can be divided into behavioral observations and physical observations. Behavioral observations can include, for example, features associated with various actions of the target. Physical observations can result from innate features associated with the target. For example, in one embodiment wherein sensor 105 includes a radar, physical observations can include Radar Cross Section (RCS). Alternatively, if sensor 105 was an infrared sensor, infrared contrast of the target to the background could also be classified as a physical observation. Behavioral observations can include position, attitude, velocity, and acceleration of the target.

Observations can also come from directly from auxiliary sensor(s) 120. For example, auxiliary sensor(s) 120 could include an infrared sensor while sensor 105 could be a radar. In this case, both RCS and infrared contrast of the target to background could be used as physical observations which can be combined by signal conditioner/information extractor 110 to improve target discrimination performance.

Each of the plurality of observations can be combined into an array called the observation vector which can be described by the equation below:

$$\vec{O} = (o_1, o_2, \ldots, o_M).$$

For each observation $o_i$ where $i=1, \ldots, M$, observation assigner 210 can assign a probability given a state, for each state that is associated with a statistical model provided by statistical modeler 215. For a given statistical model, these probabilities can be provided based upon histograms taken from previous empirical observations. The histograms can be developed using the training data which can be data previously collected. Additionally, there can be more than one statistical model provided, and additional models can be used to model different classes of targets. Statistical modeler 215 can use any statistical models known to one of ordinary skill in the art, such as, for example, Gaussian models, Poisson models, Markov models, Hidden Markov Models, etc. For one embodiment, the class of Hidden Markov Models is of particular interest, and described in more detail below.

Figure 3:
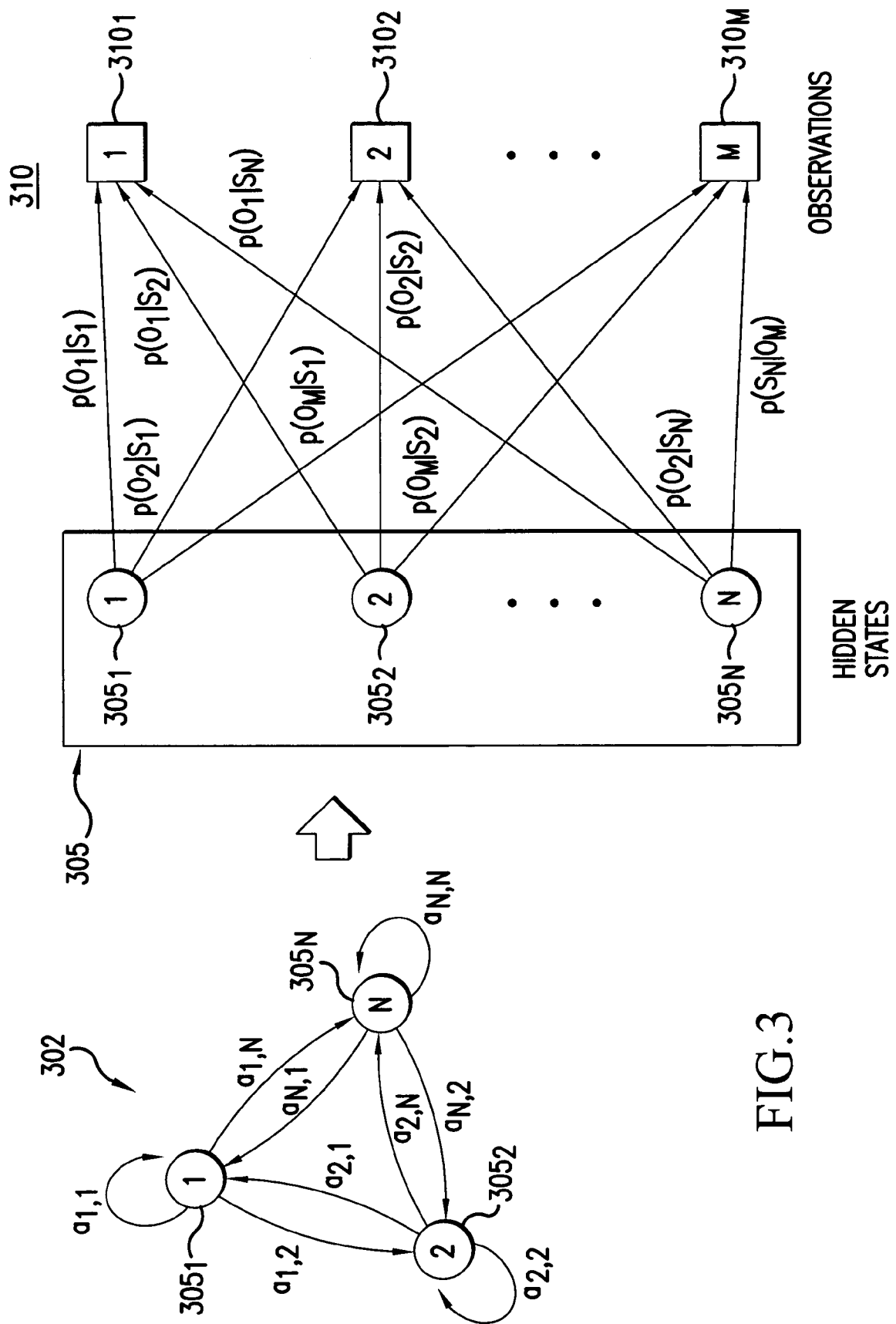
FIG. 3 shows an explanatory diagram illustrating a Hidden Markov Model.

FIG. 3 shows an explanatory diagram of a Hidden Markov Model consistent with an embodiment of the invention. A standard Markov model can be used to estimate parameters associated with a Markovian process. Markovian processes can be described as a stochastic process where the conditional probability distribution of a future state given the present state depends only upon the present state. In other words, states previous to the present state do not affect the conditional probability distribution of a future state. In the standard Markov model, the states can correspond to a directly observable event. The Hidden Markov Model (HMM) is an extension of the standard Markov model, wherein the states are not directly observable. With HMMs, the observations become a probabilistic function of state. The HMM can therefore be considered an embedded random process, wherein one underlying random process is associated with the hidden states, and another random process which is associated with the sequence of observations. In FIG. 3, 302 represents the random process associated with the hidden states of the model. In general, there can be N distinct hidden states $305_1$-$305_N$. These hidden states typically vary with different HMMs and are chosen based upon the physical process to be modeled. When performing target discrimination, different hidden states, and hence different HMMs, are typically be used for different classes of targets. For example, if the target being tracked is a ballistic shell, examples of corresponding hidden states can be particular place in the ballistic trajectory going up, near apogee, coming down, etc. In the field of facial recognition, examples of target hidden states can include the position of the head, the distance of the head from the camera, the relative distance between facial features, etc. However, it should be noted that high level HMMs can be used to model multiple target types.

Further referring to FIG. 3, a set of state transition probabilities, $a_{1,1}$-$a_{N,N}$ are provided to describe the probabilities of transitioning from one state to another state. In general, the probability of transitioning from the $i^{th}$ state to the $j^{th}$ state is given by $a_{i,j}$. For example, as shown in FIG. 3, the probability of transitioning from hidden state 2 ($305_2$) to hidden state N ($305_N$) is given by $a_{2,N}$. In practice the state transition probabilities 305 can be determined by the type of HMM used and the training data (which is typically previously collected data and/or otherwise determined using techniques known to one of ordinary skill in the art).

As stated above, with the HMM, the set states 305 ($305_1$-$305_N$) are not directly observable; however, they can be related to a set of M observations 310. Each observation, $310_1$-$310_M$, can be probabilistically related to each state $305_1$-$305_N$ through a probability of an observation given a probability of the respective state. The probability of the $i^{th}$ observation, $o_i$, given the $j^{th}$ state, $S_j$, can be mathematically represented as $P(o_i|S_j)$. These probabilities can also be determined empirically using histograms of measurements. Data which can be referred to as training data can be used to develop the histograms. For example, having the trajectory data of a certain target, the particular state associated with the target can be determined and the probability of the observation given the state. One of ordinary skill in the art would appreciate that more than one HMM can be used, so probabilities of observations for each state, within each HMM, can be provided in order to model different classes of targets. Different HMM can have different states in order to accurately model different target classes; however, different HMMs can also have some states in common. Moreover, it must be noted that additional embodiments of the invention are not restricted to HMMs. Other statistical models known in the art can be used consistent with the principles of the invention. Specifically, any statistical model which combines multiple observations can be used in conjunction with various embodiments the invention.

Referring back to FIG. 2, once the observation assigner assigns probabilities of observations given each state provided by the statistical model, these probabilities are provided to observation combiner 220 to consolidate all of the probabilities into a single probability for subsequent use by state estimator 230. Observation combiner 220 can initially weight each probability of observation given a state using a weighting value. Each observation $310_1$-$310_M$ can be associated with a unique weighting value. Through the appropriate selection of weighting values, observations which are considered important can be emphasized, while other observations of lesser importance can be weighted so their effects on the target discrimination process are diminished. Once each of the probability of observation given a state is appropriately weighted, the weighted results can be combined to produce a combined weighted probabilities of observations given a state, which is a single probability value associated with one state in the statistical model.

In one embodiment, observation combiner 220 can perform a weighted geometric average to generate the combined weighted probabilities of observation given a state. The weighted geometric average for any given state can be mathematically described by the following equation:

$$P_{weighted}\left(\vec{O}\,\Big|\,S_j\right) = \left[\prod_{n=1}^{M} P(o_n|S_j)^{\alpha_n}\right]^{\frac{1}{\sum_{n=1}^{M}}}$$

where $P_{weighted}(\vec{O}|S_j)$ is the combined weighted probabilities of observations given state $S_j$ (which can also be referred probability of the observation vector given state $S_j$), $o_n$ is the $n^{th}$ observation, $\alpha_n$ is the weight corresponding to the $n^{th}$ observation, M is the total number of observations, and $S_j$ is the $j^{th}$ state.

Typically the set of weights $\{\alpha_n: n=1, \ldots, M\}$ are determined prior to the target discrimination process and are chosen to maximize the effect of the most useful observations. Once approach to determining the weights could be to iterate over each observation and vary that observation's weight to see what effect it has on the target discriminator's result. During this process, the weights corresponding to the other observations not being iterated over could be held constant at one. This process, referred to herein as iterative optimization, can involve a significant amount of user interaction. Other optimization techniques known to those skilled in the art, such as, for example, genetic algorithms, simulated annealing, linear and/or non-linear least squares, or any other multivariate optimizer, can be used to determine the set of weighting values. Moreover, different sets of weighting values can be used by target discriminator 115, and these sets can be changed depending upon varying conditions. Observation vector weights can be different for different HMMs within a particular target discrimination algorithm. Weights can vary for different states within a single HMM. Additionally, weights can be altered to provide additional information regarding a particular facet of a target discrimination algorithm.

By using the weighted combination as described above, certain observations can be emphasized for their importance in performing target discrimination by varying the weights accordingly. Moreover, any simplifying assumptions regarding the statistical independence of the observations made in signal conditioner/information extractor 110 and/or the target discriminator 115 can also be eliminated through the appropriate choice of weights. Finally, the weighted combination can prevent underflow problems when computing the probability of the observation vector given state $S_j$.

Further referring to FIG. 2, state estimator 230 can use the combined weighted probabilities of observations given a state to determine the probability of a state given the observation vector, $P(S_j|\vec{O})$. In one embodiment, an HMM implementation of Bayes Theorem can be used for this task. This can be represented mathematically using the following equation:

$$P(S_j|\vec{O}) = \frac{P_{weighted}(\vec{O}|S_j)P(S_j)}{\sum_{j=1}^{N} P(S_j|\vec{O})}$$

where:

$P(S_j|\vec{O})$ is the probability of a state $S_j$ given the observation vector, $P_{weighted}(\vec{O}|S_j)$ is the combined weighted probability of the observation vector $\vec{O}$ given the state $S_j$, $P(S_j)$ is the probability of the state $S_j$, $$\sum_{j=1}^{N} P(S_j|\vec{O})$$

is the probability of the observations, and

N is the number of states in the statistical model.

Note $P(S_j)$ corresponds to the state transition probabilities $a_{i,j}$ as described above in FIG. 3. The state transition probabilities are determined in practice by using the training data and any statistical method, such as, for example, genetic algorithms. For example, when looking at a particular set of training data, if the amount of data that is within one state is 10% of the total, the probability of that state is 0.10. Once the probability of each state is known for all states N within a given statistical model, target discriminator 115 can make a decision regarding the identification of the target. Moreover, $P(S_j|\vec{O})$ can be calculated for each state over a plurality of different statistical models, wherein each model can correspond to different classes of targets. Using these probabilities, targets can be discriminated and identified by the highest state probability within the multiple HMMs used. For example, if there were two HMMs, one for ballistic targets and one for non-ballistic air breathing targets (e.g., aircraft), and if the highest state probability is one for a ballistic trajectory, the target is a ballistic type of target. For most competing HMMs, the states are typically mutually exclusive. A particular HMM used to discriminate the target can not be determined if the states significantly overlap.

Figure 4:
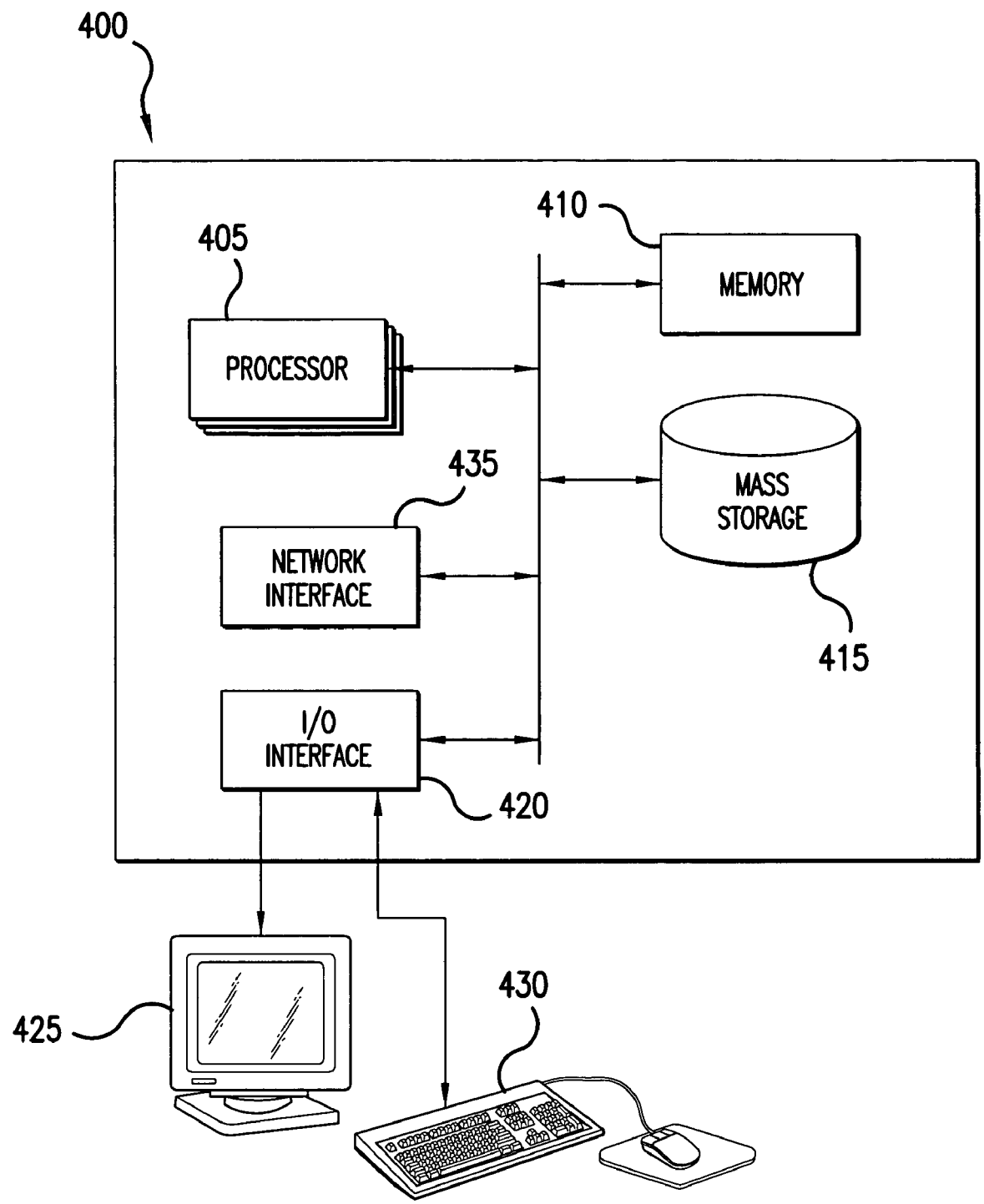
FIG. 4 shows an exemplary hardware configuration consistent with an embodiment of the invention.

FIG. 4 depicts a block diagram illustrating an example of the processing system 400 consistent with an embodiment of the invention. Processing system 400 can include: at least one processor 405, a memory 410; a mass storage 415, a network interface 435, an I/O interface 420, an output display 425, and a user interface 430. Note that processing system 400 can be any data processing equipment known to one of ordinary skill in the art, such as, for example, workstations, personal computers, special purpose computational hardware, and/or embedded processors. Processing system can execute instructions and perform calculations using at least one processor 405. Program instructions for performing target discrimination and/or weight optimization, as well as parameters associated with one or more statistical models, can be stored wholly or partially in memory 410, and transferred to processor 405 over a data bus. Mass storage can also store instructions and parameters for one or more statistical models, and communicate to processor 405 over the data bus. Mass storage 405 m also contain various databases associating probabilities of observations given a state, for each state associated with one or more statistical models. Processing system 400 can communicate to other devices over network interface 435, whereby weights, probabilities of observations given states, target discriminator 115 instructions, and/or statistical models can be updated accordingly. Processing system can provide and receive information through I/O interface 420, to provide information to users on display 425, and receive user commands and/or data through user interface 430. Moreover, the invention as disclosed herein is not constrained to using HMMs, and can use any appropriate statistical models known to one of ordinary skill in the art.

Figure 5:
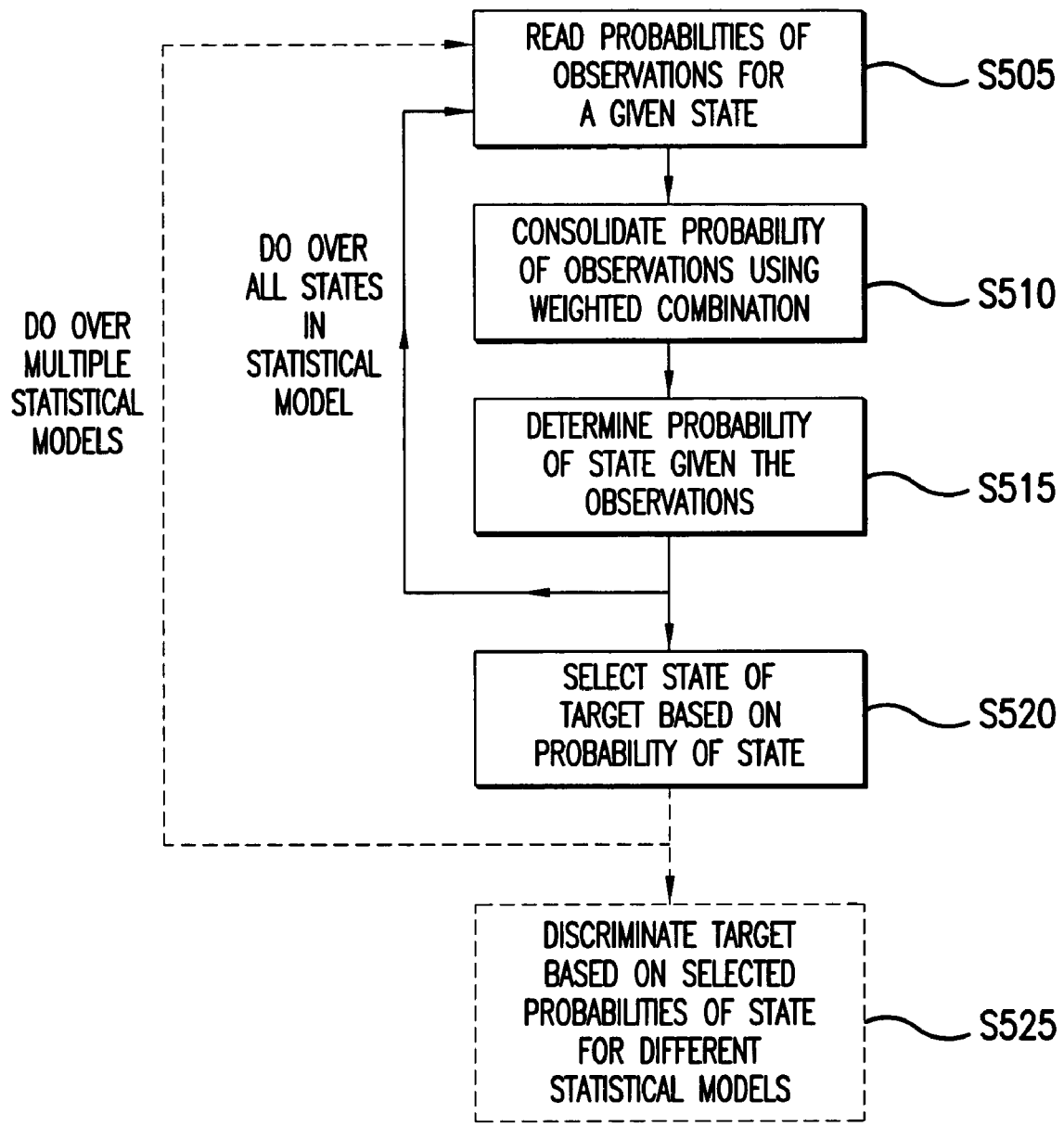
FIG. 5 shows a flowchart of an exemplary target discrimination process consistent with an embodiment of the invention.

FIG. 5 shows a flowchart of an exemplary target discrimination process consistent with an embodiment of the invention. Observation assigner 210 can obtain probabilities of observations for a given state associated with a statistical model (S505). These can be obtained from databases stored in mass storage 415 which can be populated with empirically and/or theoretically derived data. Once the probabilities of observations given a state are determined for each state associated with the statistical model, they can be consolidated by observation combiner 220 using the weighted combination, such as, for example, a geometric average, as described above (S510). Once the combined weighted probabilities of observations are determined, the probability of state given the observations can be computed by state estimator 230, which can use, for example, Bayes theorem as described above (S515). Steps S505, S510, and S515 can be repeated for each state associated with the statistical model. Once all of the probabilities of state given the observation vector have been calculated, a state having the highest probability can be selected to identify the state of the target (S520). If the state of the target is unique to that target type, it can be identified using the state associated with the current statistical model. Optionally, steps S505 through S520 can be repeated using different statistical models (e.g., HMM having different states and/or different transitional probability distributions) to determine additional probabilities of states given the observation vector for each statistical model. Target discrimination can then be performed based upon selected probabilities of state chosen from different statistical models (S525).

Figure 6:
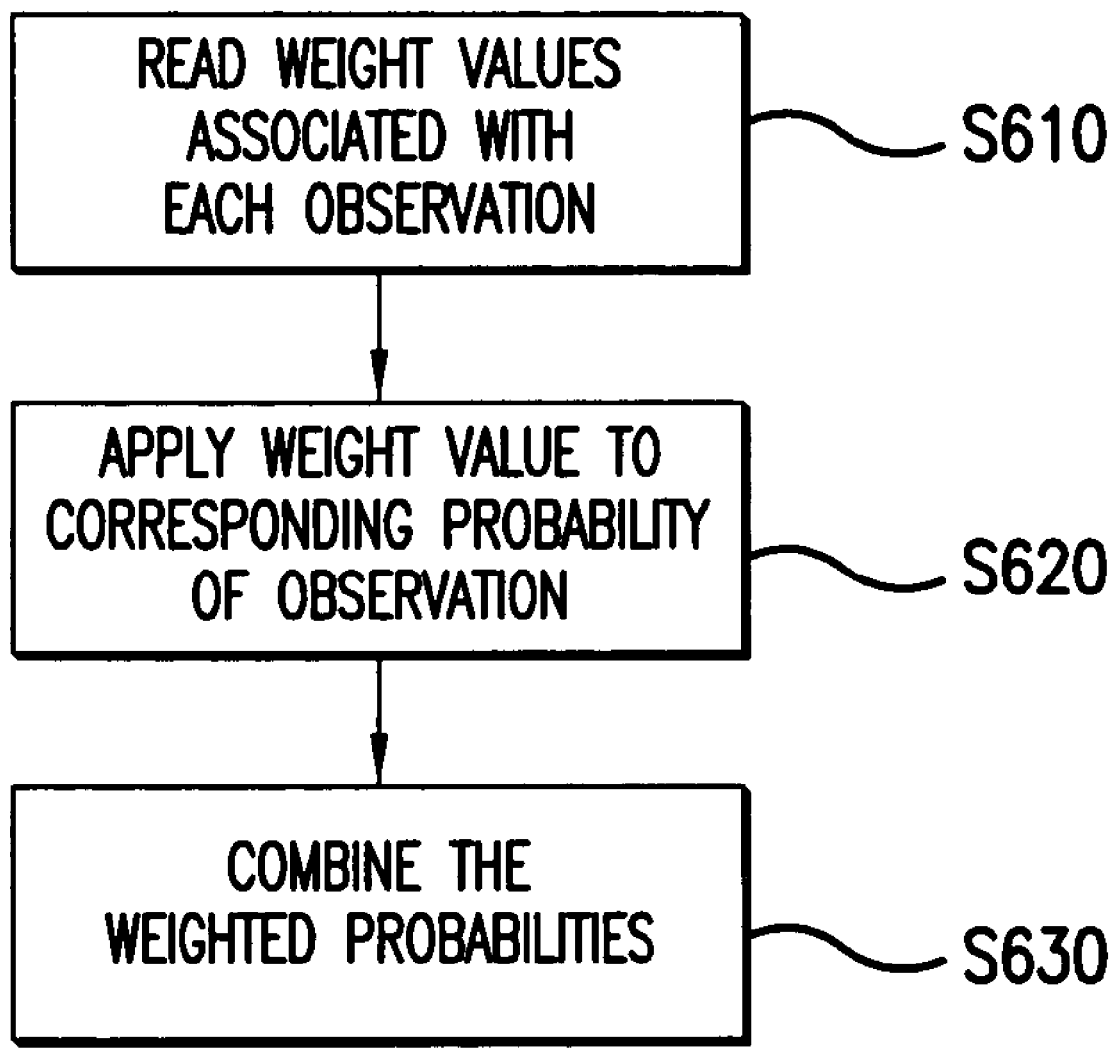
FIG. 6 shows another flowchart of an exemplary process for combining probabilities of observations consistent with an embodiment of the invention.

FIG. 6 shows another flowchart of an exemplary process for combining probabilities of observations consistent with an embodiment of the invention. Initially, observation combiner 220 can read a set of weights from memory 410 (S610). Each probability of observation given a state can then be weighted using a weighting value which corresponds to the observation (S620). Once weighted, the probabilities of observations given the state can be combined into a single probability value given plurality of observations (i.e., the observation vector) (S630). In one embodiment, a geometric mean can be utilized, as previously described above, by observation combiner 220 to perform steps S610-S630. However, one of ordinary skill in the art would appreciate that other embodiments of the invention can utilize different weighted combinations to perform steps S610-S630.

While embodiments of the invention illustrated above included sensors, such as radar, utilizing Hidden Markov Models for target discrimination, one of ordinary skill in the art would appreciate the invention can be used with other applications using Hidden Markov Models and Bayesian theory, such as, for example, speech recognition, genetic testing, vision systems, data mining, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for discriminating targets using information derived from at least one sensor, comprising:
   receiving, from the at least one sensor, a plurality of observations corresponding to a target;
   combining the plurality of observations into an observation vector;
   assigning, to each observation in the vector, a probability associated with a state, wherein the states are based upon a statistical model associated with at least one target type;
   weighting each assigned observation probability associated with a particular state with a weighting value, where weighting includes:
      providing a plurality of weighting values, wherein each weighting value is associated with a particular observation; and
      selecting each weighting value based upon the importance of its corresponding observation;
   consolidating the weighted probabilities of observations for a particular state;
   computing the probability of each particular state based on results of said consolidating;
   selecting a state of the target based upon the computed probability of each particular state; and
   discriminating the target based upon the selected state.

2. The method according to claim 1, wherein the states are associated with a plurality of models, each model being associated with a different target type.

3. The method according to claim 1, wherein the model is a Hidden Markov Model.

4. The method according to claim 1, wherein the probabilities of observations are consolidated using a weighted geometric average.

5. The method according to claim 1, said selecting each weighting value further including optimizing each weighting value based upon at least one of an iterative optimization, a genetic algorithm, and a least-squares optimization.

6. The method according to claim 1, wherein the plurality of weight values may include different sets of weight values, and further comprise varying the different sets.

7. The method according to claim 1, wherein the computing the probability of each state associated with the combined weighted probabilities of observations is based upon a Bayesian analysis.

8. The method according to claim 1, wherein the observations include at least one of radar cross section, infrared contrast, background contrast, position, velocity, acceleration, and attitude.

9. An apparatus which performs target discrimination using information derived from a sensor, comprising:
   at least one processor unit; and
   memory functionally coupled to the processor, which
      stores probabilities of sensor-derived observations associated with each of a plurality of states, wherein the states are based upon a statistical model associated with at least one target type, and
      stores instructions causing the processor to receive a plurality of observations corresponding to a target;
      combine the plurality of observations into an observation vector;
      store the observation vector in memory;
      assign, to each observation in the vector, a probability associated with a state, wherein the states are based upon a statistical model associated with at least one target type;
      weight each assigned observation probability associated with a particular state with a weighting value, wherein each weighting value uniquely corresponds to one observation and is selected based upon the importance of the corresponding observation;
      consolidate the weighted probabilities of observations for a particular state;

compute the probability of each particular state based on results of said consolidating;

select a state of the target based upon the computed probability of state, and discriminate the target based upon the selected state.

10. The apparatus according to claim 9, wherein the model is a Hidden Markov Model.

11. The apparatus according to claim 9, wherein the probabilities of observations are consolidated using a weighted geometric average.

12. The apparatus according to claim 11, wherein the memory further stores a plurality of weighting values.

13. A system for performing target discrimination based upon statistical models, comprising:

a sensor which receives signals from a target;

a signal conditioner/information extractor, operably coupled to the sensor, which derives observations from the received signals;

a target discriminator, which receives the observations from the signal conditioner/information extractor, and further comprises:

at least one statistical model corresponding to an expected target, wherein the at least one statistical model includes a plurality of states;

a probability assigner that associates at least one probability associated with at least one of said plurality of states with each observation;

a weighting unit that assigns a weighting value to each assigned probability, where each weighting value uniquely corresponds to one observation and the weighting unit assigns each weighting value based upon an importance of its corresponding observation;

an observation combiner which combines from among the observations, the weighted probabilities for each of the plurality of states using a weighted geometric average thereof; and a state estimator which computes the probability of each state based on its combined, weighted observation probabilities, wherein the target discriminator selects a state of the target based upon the computed probability of each state and discriminates the target based upon the selected state.

14. The system according to claim 13, wherein the at least one model is based upon a Hidden Markov Model.

15. The system according to claim 13, wherein the weighting unit chooses each weighting value based upon at least one of an iterative optimization, a genetic algorithm, and a least-squares optimization, and further wherein the weighting values may include different sets of weighting values which may be varied sets.

16. The system according to claim 13, wherein the sensor further comprises at least one of a radar, an infrared sensor, an imaging sensor, an active phased array, a sonar, and a microphone.

17. The system according to claim 13, further comprising: at least one auxiliary sensor functionally coupled to the signal conditioner/information extractor.

18. The system according to claim 17, wherein the at least one auxiliary sensor further comprises at least one of a radar, an infrared sensor, an imaging sensor, an active phased array, a sonar, and a microphone.

19. A method for determining the state of an physical system using an observation vector containing a plurality of observations derived from at least one sensor and at least one statistical model, comprising:

receiving probabilities of a plurality of states, wherein the states are based upon the at least one statistical model;

associating at least one probability of at least one state with each sensor-derived observation in said vector;

providing a plurality of weight values, wherein each weight value uniquely corresponds to one observation;

selecting each weight value based upon the importance of its corresponding observation;

applying each selected weight value to a corresponding observation probability;

combining, for each of said plurality of states, the weighted probabilities associated with that state; and computing the probability of each state based on the combined weighted probabilities of observations associated with said state.

20. The method according to claim 19, wherein the at least one statistical model includes a Hidden Markov Model.

21. The method according to claim 19, wherein said at least one sensor may include at least one of a radar, an infrared sensor, an imaging sensor, an active phased array, a sonar, and a microphone.

22. The method according to claim 19, further comprising: optimizing the selecting of each weight value based upon at least one of an iterative optimization, a genetic algorithm, and a least-squares optimization.

23. The method according to claim 19, wherein the plurality of weight values may include different sets of weight values, and further comprise varying the different sets.

24. The method according to claim 19, further comprising: computing the combined weighted probability of observations for a state by the following formula $$P_{weighted}(\vec{O}|S) = \left[\prod_{n=1}^{M} P(o_n|S)^{\alpha_n}\right]^{\frac{1}{\sum_{n=1}^{M}\alpha_n}}$$

wherein, $P_{weighted}(\vec{O}|S)$ represents the combined weighted probability of observations associated with the state S, $P(o_n|S)$ represents the probability of an $n^{th}$ observation $o_n$ given the state S, $\alpha_n$ represents a weight associated with the $n^{th}$ observation, and M is the total number of observations.

* * * * *